US012784248B2

(12) United States Patent
Ishida et al.

(10) Patent No.: US 12,784,248 B2
(45) Date of Patent: Nov. 3, 2026

(54) DEPTH INFORMATION CORRECTION USING INFORMATION PROCESSING DEVICE, INFORMATION PROCESSING METHOD, IMAGING DEVICE, AND INFORMATION PROCESSING SYSTEM

(71) Applicant: KYOCERA Corporation, Kyoto (JP)

(72) Inventors: Takayuki Ishida, Hirakata (JP); Hiroaki Miyamura, Fujisawa (JP); Masato Mori, Osaka (JP); Fidelia Gracia, Osaka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 18/292,104

(22) PCT Filed: Jul. 26, 2022

(86) PCT No.: PCT/JP2022/028813
§ 371 (c)(1),
(2) Date: Jan. 25, 2024

(87) PCT Pub. No.: WO2023/008441
PCT Pub. Date: Feb. 2, 2023

(65) Prior Publication Data

US 2024/0346674 A1 Oct. 17, 2024

(30) Foreign Application Priority Data

Jul. 26, 2021 (JP) ................................ 2021-121955

(51) Int. Cl.
*H04N 13/00* (2018.01)
*B25J 9/16* (2006.01)
(Continued)

(52) U.S. Cl.
CPC ............ *G06T 7/593* (2017.01); *B25J 9/1697* (2013.01); *H04N 13/239* (2018.05); *G06T 2207/10012* (2013.01); *H04N 2013/0081* (2013.01)

(58) Field of Classification Search
CPC ........... G06T 7/593; G06T 2207/10012; G06T 2207/30208; G06T 5/80; B25J 9/1697;
(Continued)

(56) References Cited

U.S. PATENT DOCUMENTS 8,306,323 B2 * 11/2012 Sim ...................... H04N 13/257 345/422
10,052,767 B2 * 8/2018 Maruyama ............... B25J 21/00
(Continued)

FOREIGN PATENT DOCUMENTS

JP 2005-168054 A 6/2005
JP 2006-071657 A 3/2006
(Continued)

OTHER PUBLICATIONS

Basso et al., "Robust Intrinsic and Extrinsic Calibration of RBG-D Cameras", in IEEE Transactions on Robotics, vol. 34, No. 5, 2018, 18 pages, DOI: 10.1109/TRO.2018.2853742.

*Primary Examiner* — Susan E. Hodges
(74) *Attorney, Agent, or Firm* — Procopio, Cory, Hargreaves & Savitch LLP

(57) ABSTRACT

An information processing device includes a control unit. The control unit acquires depth information in a predetermined space and distortion information of an imaging device that generates the depth information. The control unit corrects the depth information based on the distortion information to generate corrected depth information.

9 Claims, 7 Drawing Sheets

(51) Int. Cl.
*G06T 7/593* (2017.01)
*H04N 13/239* (2018.01)

(58) Field of Classification Search
CPC ......... H04N 13/239; H04N 2013/0081; G05B 2219/37567; G01B 11/24; G01B 21/045; G01C 3/08; G01C 3/14
USPC ............................................................ 348/47
See application file for complete search history.

(56) References Cited

U.S. PATENT DOCUMENTS

| | | | | |
|---|---|---|---|---|
| 10,129,521 | B2 * | 11/2018 | Einecke | G06T 7/593 |
| 10,341,633 | B2 | 7/2019 | Lindner et al. | |
| 10,430,956 | B2 * | 10/2019 | Lee | G01S 17/36 |
| 2015/0022726 | A1 * | 1/2015 | Kojima | H04N 9/3185 348/745 |
| 2017/0148168 | A1 * | 5/2017 | Lindner | G06T 7/593 |
| 2018/0350107 | A1 * | 12/2018 | Myokan | H04N 23/64 |
| 2020/0410650 | A1 * | 12/2020 | Yamazaki | G06T 5/50 |
| 2021/0174531 | A1 * | 6/2021 | Miyata | G01B 11/2545 |
| 2022/0295037 | A1 * | 9/2022 | Teranishi | G02B 7/028 |

FOREIGN PATENT DOCUMENTS

| | | | |
|---|---|---|---|
| JP | 2009-302697 | A | 12/2009 |
| JP | 2011-130290 | A | 6/2011 |
| JP | 2015-005200 | A | 1/2015 |
| JP | 2017-096817 | A | 6/2017 |
| JP | 2018-534699 | A | 11/2018 |
| JP | 2019-125056 | A | 7/2019 |
| KR | 102079686 | B1 | 4/2020 |
| KR | 1020200063938 | A | 6/2020 |

* cited by examiner

DEPTH INFORMATION CORRECTION USING INFORMATION PROCESSING DEVICE, INFORMATION PROCESSING METHOD, IMAGING DEVICE, AND INFORMATION PROCESSING SYSTEM

CROSS-REFERENCE TO RELATED APPLICATIONS

This application claims priority of Japanese Patent Application No. 2021-121955 filed in Japan on Jul. 26, 2021, the entire disclosure of which being incorporated herein by reference.

TECHNICAL FIELD

The present disclosure relates to an information processing device, an information processing method, an imaging device, and an information processing system.

BACKGROUND OF INVENTION

Conventionally, systems for correcting depth information have been known (see, for example, Patent Literature 1).

CITATION LIST

Patent Literature

Patent Literature 1: Japanese Unexamined Patent Application Publication (Translation of PCT Application) No. 2018-534699

SUMMARY

An information processing device according to one embodiment of the present disclosure includes a control unit. The control unit acquires depth information in a predetermined space and distortion information of an imaging device that generates the depth information, and corrects the depth information based on the distortion information to generate corrected depth information.

An information processing method according to one embodiment of the present disclosure includes obtaining depth information in a predetermined space and distortion information of an imaging device that generates the depth information. The information processing method further includes correcting the depth information based on the distortion information to generate corrected depth information.

An imaging device according to one embodiment of the present disclosure includes at least two imaging elements that photograph images of a predetermined space, an optical system that forms images of the predetermined space on the imaging elements, a storage unit, and a control unit. The storage unit stores, as distortion information, information about enlargement, reduction or distortion of images photographed by each imaging element caused by at least one of characteristics of the optical system and errors in the placement of the imaging elements. The control unit generates depth information of the predetermined space based on images obtained by photographing the predetermined space with each imaging element, and outputs the depth information and the distortion information.

An information processing system according to one embodiment of the present disclosure includes an information processing device and an imaging device. The imaging device includes at least two imaging elements that photograph images of a predetermined space, an optical system that forms images of the predetermined space on the imaging elements, a storage unit, and a control unit. The storage unit stores, as distortion information, information about enlargement, reduction or distortion of images photographed by each imaging element caused by at least one of characteristics of the optical system and errors in the placement of the imaging elements. The control unit generates depth information of the predetermined space based on the images obtained by photographing the predetermined space with each imaging element, and outputs the depth information and the distortion information to the information processing device. The information processing device acquires the depth information and the distortion information from the imaging device and corrects the depth information based on the distortion information to generate corrected depth information.

DESCRIPTION OF EMBODIMENTS

Depth information needs to be corrected in a convenient manner. Depth information can be easily corrected with an information processing device, an information processing method, an imaging device, and an information processing system of the present disclosure.

(Overview of Robot Control System 1)

Figure 1:
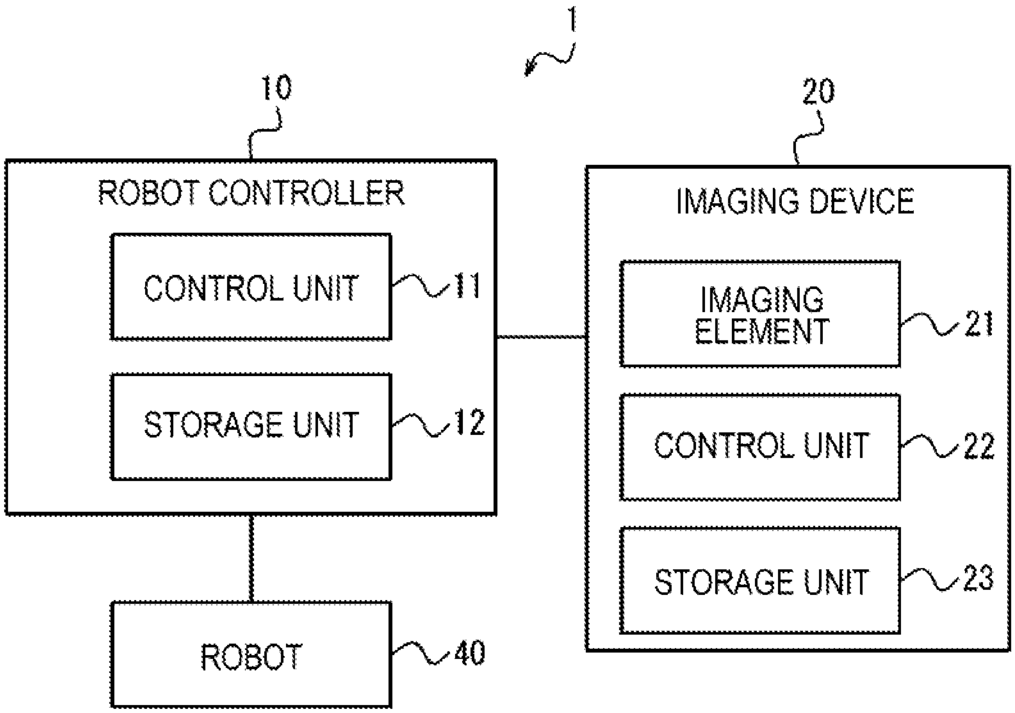
FIG. 1 is a block diagram showing an example of a configuration of a robot control system according to one embodiment.
Figure 2:
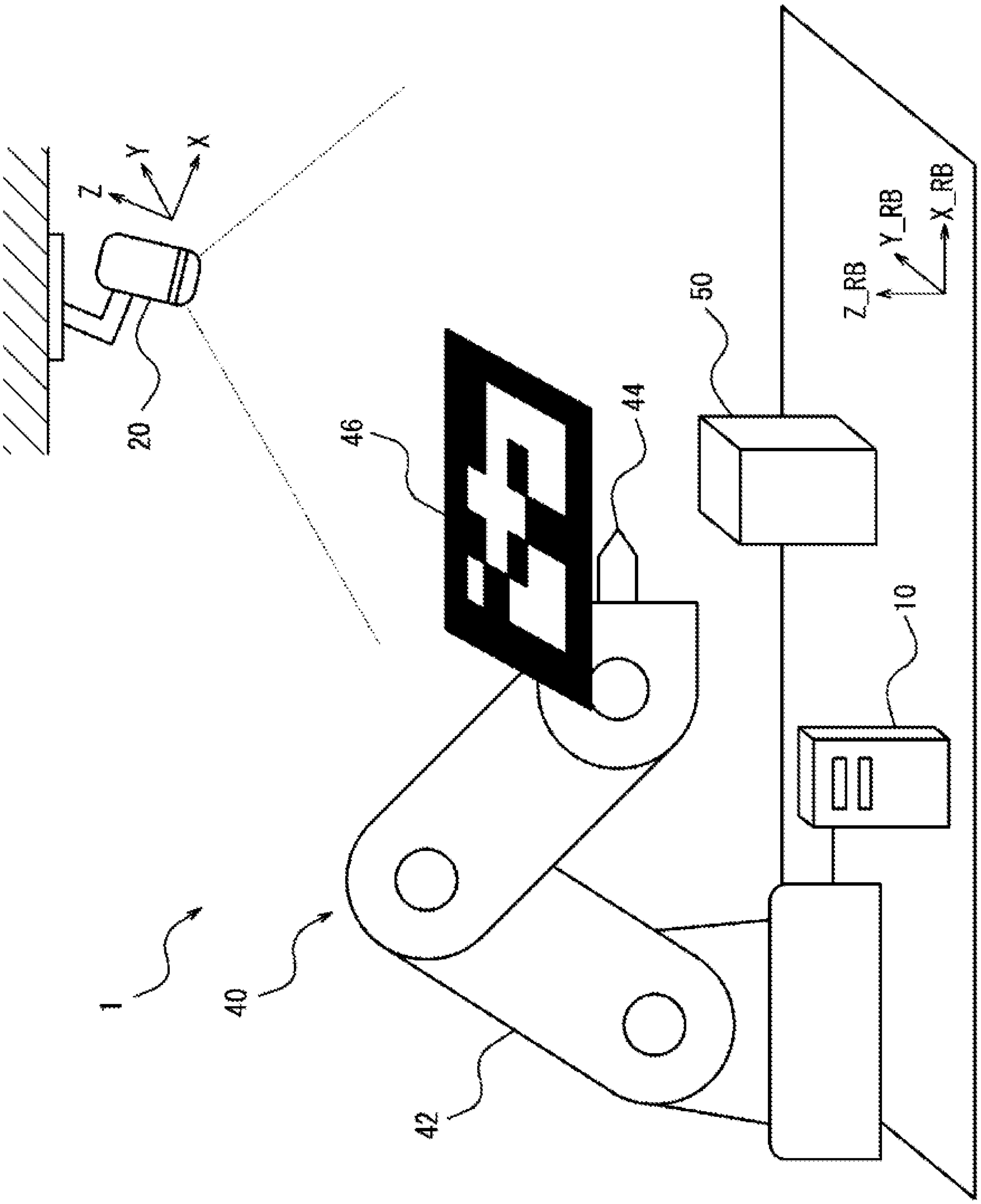
FIG. 2 is a schematic view showing the example of the configuration of the robot control system according to the embodiment.

As illustrated in FIGS. 1 and 2, a robot control system 1 according to one embodiment includes a robot 40, a robot controller 10, and an imaging device 20. The robot 40 operates in a predetermined work space. The imaging device 20 generates depth information of the work space in which the robot 40 operates. The imaging device 20 generates the depth information of the work space based on an (X, Y, Z) coordinate system. The robot controller 10 operates the robot 40 based on the depth information generated by the imaging device 20. The robot controller 10 operates the robot 40 based on an (X_RB, Y_RB, Z_RB) coordinate system.

The (X_RB, Y_RB, Z_RB) coordinate system may be set as the same coordinate system as the (X, Y, Z) coordinate system or as a different coordinate system from the (X, Y, Z) coordinate system. When the (X_RB, Y_RB, Z_RB) coordinate system is set as a coordinate system different from the (X, Y, Z) coordinate system, the robot controller 10 converts the depth information generated by the imaging device 20 in the (X, Y, Z) coordinate system to depth information in the (X_RB, Y_RB, Z_RB) coordinate system and uses the converted depth information.

The number of the robots 40 and the robot controllers 10 is not limited to one, but may be two or more. The number of the imaging devices 20 may be one, two or more per work space. Each component is described in detail below.

<Robot Controller 10>

The robot controller 10 includes a control unit 11 and a storage unit 12. The robot controller 10 is also referred to as an information processing device. Note that, in the present invention, the information processing device is not limited to the robot controller 10, but may be other components of the robot control system 1. The information processing device may be, for example, the imaging device 20.

The control unit 11 may include at least one processor to perform various functions of the robot controller 10. The processor may execute programs that implement the various functions of the robot controller 10. The processor may be realized as a single integrated circuit. The integrated circuit is also referred to as an IC (Integrated Circuit). The processor may also be realized as a plurality of communicatively connected integrated circuits and discrete circuits. The processor may include a CPU (Central Processing Unit). The processor may include a DSP (Digital Signal Processor) or a GPU (Graphics Processing Unit). The processor may be realized based on various other known technologies.

The robot controller 10 further includes the storage unit 12. The storage unit 12 may include an electromagnetic storage medium such as a magnetic disk, or may include a memory such as a semiconductor memory or magnetic memory. The storage unit 12 may be configured as an HDD (Hard Disk Drive) or an SSD (Solid State Drive). The storage unit 12 stores various information and programs executed by the control unit 11. The storage unit 12 may function as a work memory of the control unit 11. The control unit 11 may include at least a part of the storage unit 12.

The robot controller 10 may further include a communication device configured to be able to perform wired or wireless communication with the imaging device 20 and the robot 40. The communication device may be configured to be able to communicate using communication methods based on various communication standards. The communication device may be configured with a known communication technology. A detailed description of the hardware and the like of the communication device is omitted. The functions of the communication device may be realized by a single interface or by separate interfaces for each connection destination. The control unit 11 may be configured to communicate with the imaging device 20 and the robot 40. The control unit 11 may include the communication device.

<Robot 40>

As illustrated in FIG. 2, the robot 40 includes an arm 42 and an end effector 44 attached to the arm 4. The arm 42 may be configured, for example, as a 6-axis or 7-axis vertically articulated robot. The arm 42 may also be configured as a 3-axis or 4-axis horizontal articulated robot or a SCARA robot. The arm 42 may also be configured as a 2-axis or 3-axis Cartesian robot. The arm 42 may also be configured as a parallel link robot or the like. The number of axes constituting the arm 42 is not limited to those described in the above examples.

The end effector 44 may include, for example, a gripping hand capable of grasping the work target. The gripping hand may have a plurality of fingers. The number of fingers of the gripping hand may be two or more. The finger of the grasping hand may have one or more joints. The end effector 44 may include a suction hand capable of sucking a work target. The end effector 44 may include a scooping hand capable of scooping up the work target. The end effector 44 may include a drill or other tool capable of performing various machining operations, such as drilling a hole in the work target. The end effector 44 may be configured to perform various other operations, rather than being limited to those described in the above examples.

The robot 40 can control the position of the end effector 44 by moving the arm 42. The end effector 44 may have an axis that serves as a reference for the direction of action with respect to the work target. If the end effector 44 has such an axis, the robot 40 can control the direction of the axis of the end effector 44 by moving the arm 42. The robot 40 controls the start and end of the operation of the end effector 44 acting on the work target. The robot 40 can move or process the work target by controlling the operation of the end effector 44 while controlling the position of the end effector 44 or the direction of the axis of the end effector 44.

The robot 40 may further include sensors that detect the status of each component of the robot 40. The sensors may detect information about the actual position or attitude of each component of the robot 40 or the speed or acceleration of each component of the robot 40. The sensors may also detect the force acting on each component of the robot 40. The sensors may also detect the current flowing in a motor that drives each component of the robot 40 or the torque of the motor. The sensors may detect information obtained as the results of the actual operation of the robot 40. By acquiring the detection results of the sensors, the robot controller 10 can grasp the results of the actual operation of the robot 40.

The robot 40 further includes, although not required, a mark 46 attached to the end effector 44. The robot controller 10 recognizes the position of the end effector 44 based on an image obtained by photographing the mark 46 with the imaging device 20. The robot controller 10 can perform a calibration of the robot 40 using the position of the end effector 44 grasped based on the detection results of the sensors and the results of recognizing the position of the end effector 44 by the mark 46.

<Imaging Device 20>

As illustrated in FIG. 1, the imaging device 20 includes an imaging element 21, a control unit 22, and a storage unit 23. As described below, the control unit 22 calculates a distance from the imaging element 21 to a measurement point 52 (see FIG. 3) based on an image obtained by photographing a work space including the measurement point 52 with the imaging element 21. The distance to the measurement point 52 is also referred to as depth. The control unit 22 generates depth information including the calculation result of the distance (depth) to each measurement point 52 in the work space and outputs the generated depth information to the robot controller 10. The imaging device 20 may be configured as a 3D stereo camera. The distance (depth) information may be, for example, a distance along the Z-axis direction from the imaging element 21, or may be a distance from the imaging element 21 taking into account each component of the xyz coordinate system.

The control unit 22 may include at least one processor. The processor can execute programs that realize various functions of the imaging device 20. The storage unit 23 may include an electromagnetic storage medium such as a magnetic disk, or may include a memory such as a semiconductor memory or magnetic memory. The storage unit 23 may be configured as an HDD or SSD. The storage unit 23 stores various information and programs executed by the control unit 22. The storage unit 23 may function as a work memory of the control unit 22. The control unit 22 may include at least a part of the storage unit 23.

Figure 3:
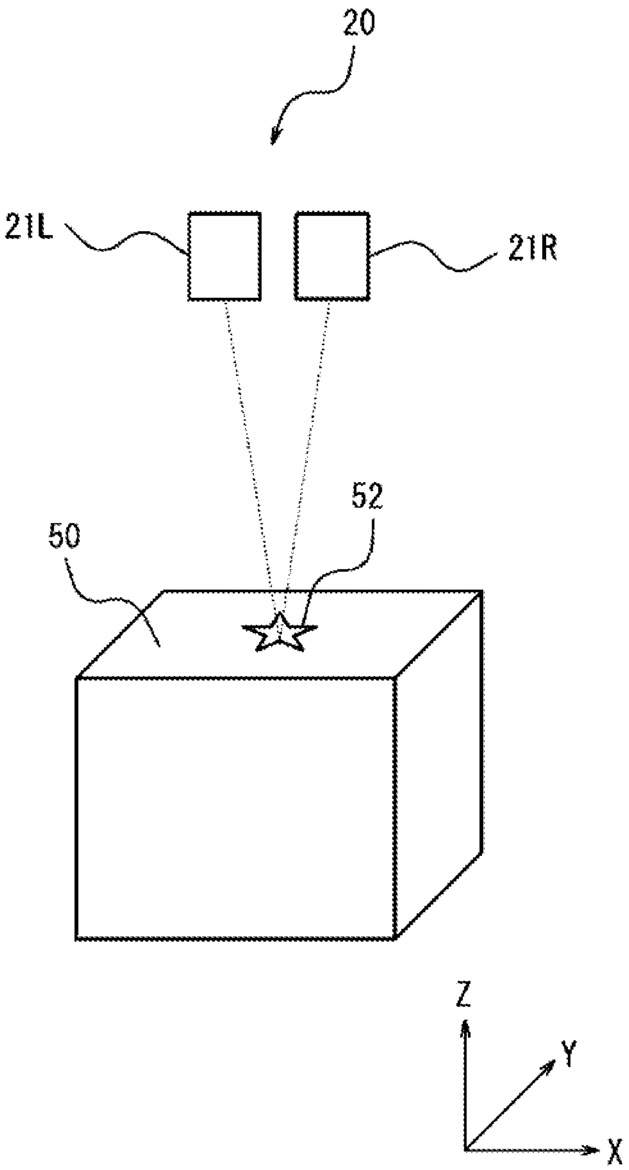
FIG. 3 is a schematic view showing an example of a configuration in which a measurement point of depth is photographed by an imaging device.
Figure 4:
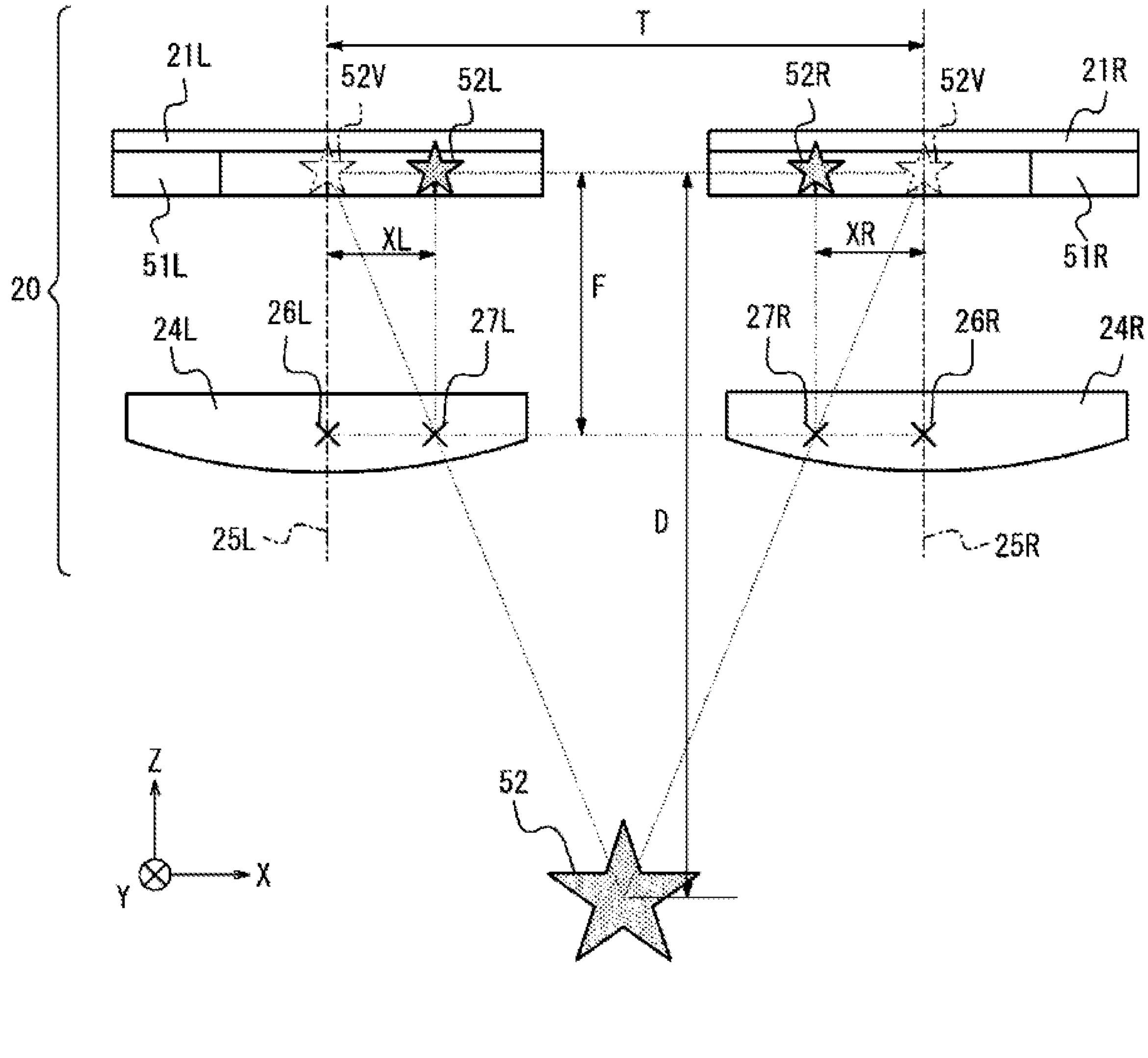
FIG. 4 is a view showing an example of the positional relationship between the imaging device and the measurement point.

As illustrated in FIGS. 3 and 4, the imaging element 21 includes a left imaging element 21L and a right imaging element 21R, as well as a left optical system 24L and a right optical system 24R. In FIGS. 3 and 4, the (X, Y, Z) coordinate system is set as a coordinate system with the imaging device 20 as a reference. The left imaging element 21L and the right imaging element 21R are positioned side by side in the X-axis direction. The left optical system 24L has an optical center 26L and an optical axis 25L passing through the optical center 26L and extending in the Z-axis direction. The right optical system 24R has an optical center 26R and an optical axis 25R passing through the optical center 26L and extending in the Z-axis direction. The left imaging element 21L and the right imaging element 21R photograph images of the object 50 located on the negative side of the Z-axis formed by the left optical system 24L and the right optical system 24R, respectively. The left imaging element 21L photographs the image of the object 50 and the measurement point 52 included in the object 50 formed by the left optical system 24L. The image photographed by the left imaging element 21L is illustrated in FIG. 4 as a left photographed image 51L. The right imaging element 21R photographs the image of the object 50 and the measurement point 52 included in the object 50 formed by the right optical system 24R. The image photographed by the right imaging element 21R is illustrated in FIG. 4 as a right photographed image 51R.

The left photographed image 51L includes a left image 52L of the measurement point 52 obtained by photographing the measurement point 52. The right photographed image 51R includes a right image 52R of the measurement point 52 obtained by photographing the measurement point 52. In the left photographed image 51L and the right photographed image 51R, a virtual measurement point image 52V is described. The virtual measurement point image 52V represents a virtual measurement point 52 in an image obtained by photographing, with the imaging element 21, the virtual measurement point 52 located at an infinite distance from the imaging device 20.

The virtual measurement point image 52V is located on the optical axis 25L of the left optical system 24L and the optical axis 25R of the right optical system 24R. The virtual measurement point image 52V is located at the center of the left photographed image 51L and the center of the right photographed image 51R. In FIG. 4, it is assumed that the virtual measurement point image 52V represents a virtual measurement point 52 in an image obtained by photographing, with the two imaging elements 21, the virtual measurement point 52 located at an infinite distance along a line extending from the midpoint of the two imaging elements 21 to the negative direction of the Z axis. In such a case, the virtual measurement point image 52V is located at the center of the photographed image in the X-axis direction. If the measurement point 52 is displaced from the midpoint of the two imaging elements 21 in the positive or negative direction of the X axis, the virtual measurement point image 52V is displaced from the center of the photographed image in the X-axis direction.

In other words, the image of the real measurement point 52 located at a finite distance from the imaging device 20 is formed at a position displaced from the virtual measurement point image 52V, such as the left image 52L of the measurement point 52 in the left photographed image 51L and the right image 52R of the measurement point 52 in the right photographed image 51R. The positions of the left image 52L of the measurement point 52 and the right image 52R of the measurement point 52 are determined as follows. First, an incident point 27L is assumed to be at the intersection of a dashed line connecting the optical center 26L of the left optical system 24L and the optical center 26R of the right optical system 24R and a dashed line connecting the measurement point 52 and the virtual measurement point image 52V of the left photographed image 51L. Further, an incident point 27R is assumed to be at the intersection of the dashed line connecting the optical center 26L of the left optical system 24L and the optical center 26R of the right optical system 24R and a dashed line connecting the measurement point 52 and the virtual measurement point image 52V in the right photographed image 51R. The left image 52L of the measurement point 52 of the left photographed image 51L is located at the intersection of a dashed line extending in the positive direction of the Z axis from the incident point 27L and a dashed line connecting the virtual measurement point images 52V of the left photographed image 51L and the right photographed image 51R. The right image 52R of the measurement point 52 of the right photographed image 51R is located at the intersection of a dashed line extending in the positive direction of the Z axis from the incident point 27R and the dashed line connecting the virtual measurement point images 52V of the left photographed image 51L and the right photographed image 51R.

The control unit 22 of the imaging device 20 can calculate the distance from the imaging device 20 to the measurement point 52 based on the difference between the X coordinates of the left image 52L of the measurement point 52 in the left photographed image 51L and the right image 52R of the measurement point 52 in the right photographed image 51R and the X coordinate of the virtual measurement point image 52V. The control unit 22 may calculate the distance from the imaging device 20 to the measurement point 52 based further on the distance between the centers of the two imaging elements 21 and the focal length of the optical system that forms the image on each imaging element 21. In FIG. 4, the distance (depth) from the imaging device 20 to the measurement point 52 is represented by D. An example of the calculation of the depth is described below.

Parameters used to calculate the depth are described below. The distance between the center of the left photographed image 51L and the center of the right photographed image 51R is represented by T. The difference between the X coordinate of the virtual measurement point image 52V of the left photographed image 51L and the X coordinate of the left image 52L of the measurement point 52 is represented by XL. The sign of XL is positive when the left image 52L of the measurement point 52 is located in a more positive direction on the X axis than the virtual measurement point image 52V of the left photographed image 51L. The difference between the X coordinate of the virtual measurement point image 52V of the right imaging element 21R and the X coordinate of the right image 52R of the measurement point 52 is represented by XR. The sign of XR is positive when the right image 52R of the measurement point 52 is located in a more negative direction on the X axis than the virtual measurement point image 52V of the right photographed image 51R. In other words, the signs of XL and XR are positive when the left image 52L and the right image 52R of the measurement point 52 are displaced from the virtual measurement point image 52V in the direction closer to each other.

The focal lengths of the left optical system 24L and the right optical system 24R are represented by F. The left imaging element 21L and the right imaging element 21R are positioned so that the focal points of the left optical system 24L and the right optical system 24R are located on their imaging surfaces. The focal lengths (F) of the left optical system 24L and the right optical system 24R correspond to the distances from the left optical system 24L and the right optical system 24R to the imaging surfaces of the left imaging element 21L and the right imaging element 21R.

Specifically, the control unit 22 can calculate the depth by operating as follows.

The control unit 22 detects the X coordinate of the left image 52L of the measurement point 52 in the left photographed image 51L. The control unit 22 calculates the difference between the X coordinate of the left image 52L of the measurement point 52 and the X coordinate of the virtual measurement point image 52V as XL. The control unit 22 detects the X coordinate of the right image 52R of the measurement point 52 in the right photographed image 51R. The control unit 22 calculates the difference between the X coordinate of the right image 52R of the measurement point 52 and the X coordinate of the virtual measurement point image 52V as XR.

Here, in the XZ plane, a first triangle is considered to exist with the measurement point 52, the virtual measurement point image 52V of the left photographed image 51L and the virtual measurement point image 52V of the right photographed image 51R as vertices. In the XZ plane, a second triangle is considered to exist with the measurement point 52, the assumed incident point 27L in the left optical system 24L and the assumed incident point 27R in the right optical system 24R as vertices. The Z coordinate of the optical center 26L of the left optical system 24L is the same as the Z coordinate of the optical center 26R of the right optical system 24R. The Z coordinate of the virtual measurement point image 52V of the left photographed image 51L is the same as the Z coordinate of the virtual measurement point image 52V of the right photographed image 51R. Therefore, the first triangle and the second triangle are similar to each other.

The distance between the two virtual measurement point images 52V of the first triangle is T. The distance between the incident points 27L and 27R of the second triangle is T−(XL+XR). Since the first triangle and the second triangle are similar, the following Formula (1) is satisfied.

$$T/\{T-(XL+XR)\}=D/(D-F) \quad (1)$$

Based on Formula (1), Formula (2) for calculating D is derived as follows.

$$D=T\times F/(XL+XR) \quad (2)$$

In Formula (2), the larger XL+XR is, the smaller D is calculated. On the other hand, if XL+XR=0, then D is infinite. For example, if the left image 52L of the left photographed image 51L coincides with the virtual measurement point image 52V and the right image 52R of the right photographed image 51R coincides with the virtual measurement point image 52V, D is calculated to be infinite. In fact, since the left image 52L and the right image 52R are defined to coincide with the virtual measurement point image 52V when the measurement point 52 is located at infinity, it can be said that D can be correctly calculated by Formula (2).

The control unit 22 can calculate the depth based on the two photographed images obtained by photographing the measurement point 52 with the two imaging elements 21 as described above. The control unit 22 calculates the distances to a plurality of measurement points 52 included in the photographed image of the work space of the robot 40, generates depth information representing the distance (depth) to each measurement point 52, and outputs the generated depth information to the robot controller 10. The depth information can be expressed by a function that takes X coordinate and Y coordinate as arguments, respectively, in the (X, Y, Z) coordinate system of the imaging device 20. The depth information can also be expressed as a two-dimensional map obtained by plotting depth values on the XY plane of the imaging device 20.

(Effects of Distortion of Photographed Image on Depth Information)

As described above, the imaging device 20 generates depth information based on the positions of the images of the measurement point 52 in the two photographed images obtained by photographing the work space with the left imaging element 21L and the right imaging element 21R. Here, the photographed image may be photographed as an enlarged, reduced, or distorted image relative to the actual work space. The enlargement, reduction, or distortion of the photographed image relative to the actual work space is also referred to as distortion of the photographed image. If the distortion occurs in the photographed image, the position of the image of the measurement point 52 in the photographed image may be displaced. As a result, the distortion of the photographed image causes errors in the calculation result of the depth. The distortion of the photographed image also causes errors in the depth information, which represents the calculation result of the depth.

Figure 5:
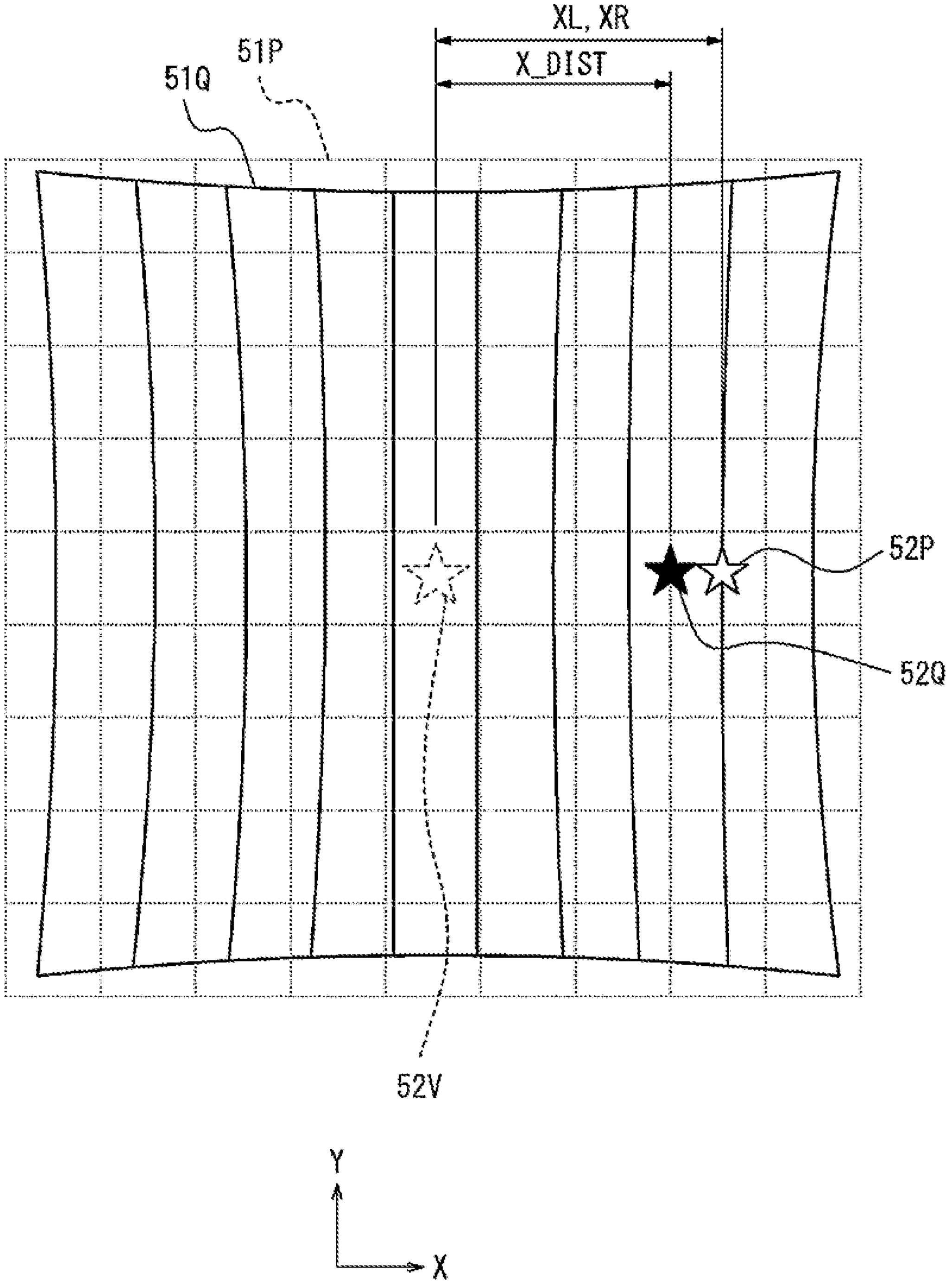
FIG. 5 is a view comparing a distorted image and a non-distorted image.

For example, as illustrated in FIG. 5, a distorted image 51Q is assumed to be a photographed image with distortion. On the other hand, a non-distorted image 51P is assumed to be a photographed image without distortion. The distorted image 51Q is assumed to be reduced in size relative to the non-distorted image 51P. The reduction rate of the distorted image 51Q in the X-axis direction and the Y-axis direction is assumed to be smaller than the reduction rate in the other directions.

A measurement point image 52Q in the distorted image 51Q is closer to the virtual measurement point image 52V than a measurement point image 52P in the non-distorted image 51P. In other words, X_DIST, which represents the distance from the measurement point image 52Q in the non-distorted image 51Q to the virtual measurement point image 52V, is shorter than XL or XR, which represents the distance from the measurement point image 52P in the distorted image 51P to the virtual measurement point image 52V. Therefore, in the above Formula (2), which is used to calculate the depth (D), the value of XL+XR is smaller. As a result, the result of the depth (D) calculated by the control unit 22 of the imaging device 20 based on the distorted image 51Q is larger than the calculation result based on the non-distorted image 51P. In other words, the distortion of the photographed image can cause errors in the calculation result of the depth (D).

(Correction of Depth Information)

The control unit 11 of the robot controller 10 acquires the depth information from the imaging device 20. The control unit 11 further acquires information about the distortion of the imaging device 20. The information about the distortion of the imaging device 20 is also referred to as distortion information. The distortion information may be, for example, optical and geometric parameters obtained during the manufacturing inspection of the imaging device 20. The distortion information represents the distortion of the left photographed image 51L and the right photographed image 51R. As described above, the errors in the calculation result of the depth (D) is determined by the distortion information. Therefore, the control unit 11 can correct the errors in the depth (D) represented by the depth information acquired from the imaging device 20 based on the distortion information. Specific examples of correction methods are described below.

The control unit 11 acquires the distortion information of the imaging device 20. As the distortion information, the control unit 11 may acquire the distortion information of each of the left imaging element 21L and the right imaging element 21R. The control unit 11 may also acquire the distortion information of the imaging device 20 from an external device, such as a cloud storage. The control unit 11 may also acquire the distortion information from the imaging device 20. In such a case, the imaging device 20 may store the distortion information in the storage unit 23. The control unit 11 may acquire the distortion information from the storage unit 23 of the imaging device 20. The imaging device 20 may store address information in the storage unit 23, wherein the address information specifies the location where the distortion information of the imaging device 20 is stored. The address information may include, for example, an IP address or URL (Uniform Resource Locator) for accessing an external device, such as a cloud storage. The control unit 11 may acquire the distortion information by acquiring the address information from the imaging device 20 and accessing an external device or the like specified by the address information.

The distortion information may include the distortion of the left optical system 24L and right optical system 24R. The distortion of each optical system may include the distortion caused in the photographed image by the characteristics of each optical system. The distortion information may include the distortion of the imaging surfaces of the left imaging element 21L and the right imaging element 21R. The distortion information may include the distortion in the photographed image caused by errors in the placement of the left optical system 24L or the right optical system 24R, or errors in the placement of the left imaging element 21L or the right imaging element 21R.

The characteristics of each optical system may be, for example, the degree of curvature or the size of the curved lens. The errors in the placement of the imaging element 21 and the like may be, for example, errors in the planar position of the imaging element 21 and the like when mounted, or manufacturing errors such as inclination of the optical axis.

Figure 6:
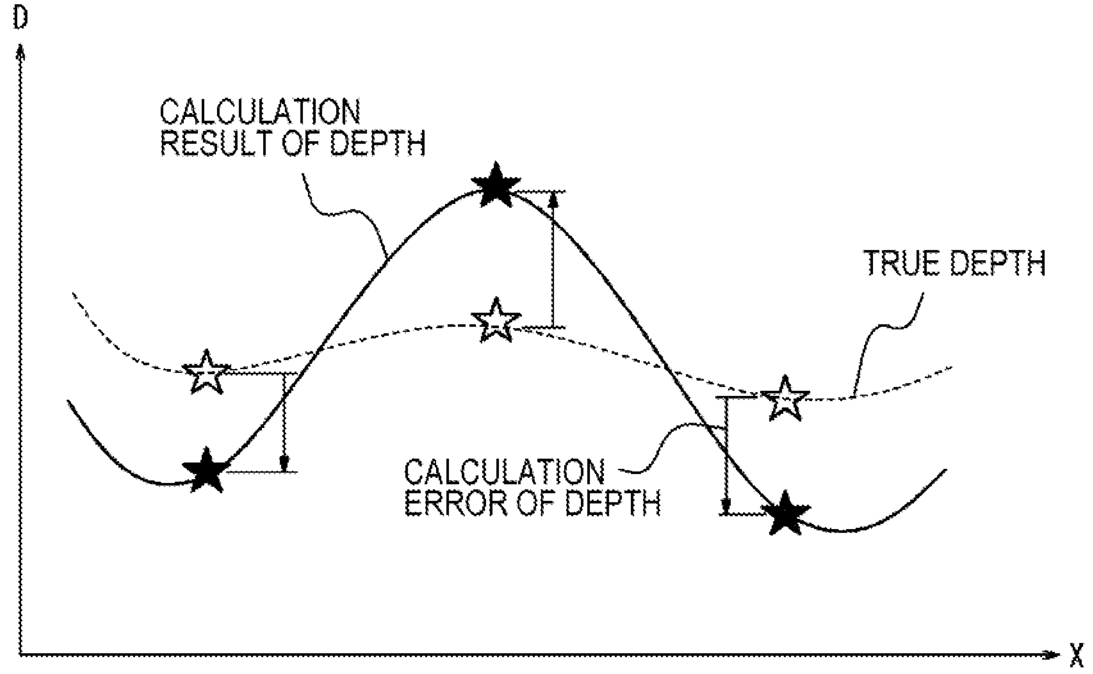
FIG. 6 is a graph showing an example of a calculation result of depth and an example of a true depth value.

For example, as shown in FIG. 6, the depth information is represented as a graph of the depth values calculated at each X coordinate when the Y coordinate is fixed at a predetermined value in the photographed image. The fixed value of the Y coordinate may be the Y coordinate of the center of the photographed image or any Y coordinate in the photographed image. In FIG. 6, the horizontal axis represents the X coordinate, and the vertical axis represents the depth value (D) at each X coordinate. The solid line represents the depth information consisting of the depth values calculated by the imaging device 20. On the other hand, the dashed line represents the depth information consisting of the values of true depth. The difference between the depth calculated by the imaging device 20 and the true depth is caused by the distortion of the imaging device 20.

Here, the control unit 11 can estimate errors of the depth value at each X coordinate based on the distortion information. Specifically, for the measurement point 52 located at (X1, Y1), the control unit 11 estimates the errors in the positions of the left image 52L and the right image 52R of the measurement point 52 in the photographed image caused by the distortion based on the distortion information. The control unit 11 can calculate a correction value for the depth value of the measurement point 52 located at (X1, Y1) based on the estimated errors in the positions of the left image 52L and the right image 52R of the measurement point 52. The correction value for the depth value is represented by D_corr. For example, when XL and XR become smaller by ΔXerr/2, respectively, due to mounting errors of the imaging element 21, the correction value for the depth value (D_corr) of the measurement point 52 at (X1, Y1) is expressed by the following Formula (3), for example.

$$\text{D\_corr} = \{D^2/(F \cdot T)\} \times \Delta xerr \tag{3}$$

In Formula (3), D is the depth value before correction. F and T are the focal length of the imaging device 20 and the distance between the centers of the two imaging elements 21, and these parameters are defined as the specification of the imaging device 20. ΔXerr can be acquired, for example, as a value estimated based on the distortion information. ΔXerr can also be acquired, for example, as the distortion information itself.

Figure 7:
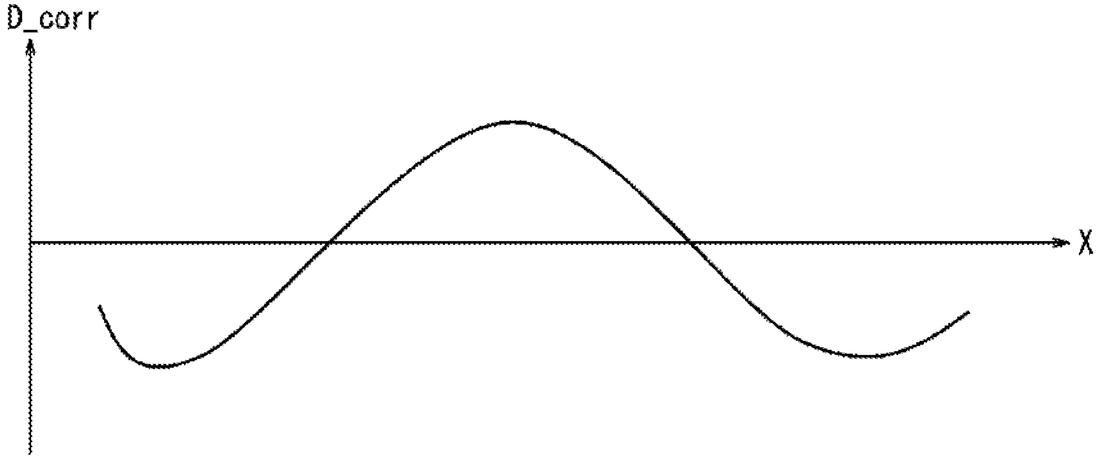
FIG. 7 is a graph showing an example of correction values for depth.

The control unit 11 can calculate the correction value for the depth value (D_corr) by substituting the estimated result of the errors in the positions of the left image 52L and the right image 52R in the photographed image of each measurement point 52 into Formula (3). The correction value for the depth value (D_corr) calculated by the control unit 11 can be represented, for example, as the graph shown in FIG. 7. In FIG. 7, the horizontal axis represents the X coordinate. The vertical axis represents the correction value for the depth value (D_corr) at each X coordinate. The formula for calculating the correction value for the depth value (D_corr) is not limited to Formula (3) above, but may be expressed in various other formulas.

As described above, the control unit 11 can estimate the correction value for the depth value (D_corr) based on the distortion information. The control unit 11 can estimate the correction value for each measurement point 52, correct the depth value of each measurement point 52, and bring the depth value closer to the true value of each measurement point 52. By correcting the depth value of each measurement point 52 of the depth information, the control unit 11 can generate corrected depth information that represents the corrected depth value. The control unit 11 may control the robot 40 based on the corrected depth information. For example, by correcting the depth value, the positioning accuracy of the robot 40 with respect to the object 50 located in the work space can be enhanced.

Example of Procedure for Information Processing Method

Figure 8:
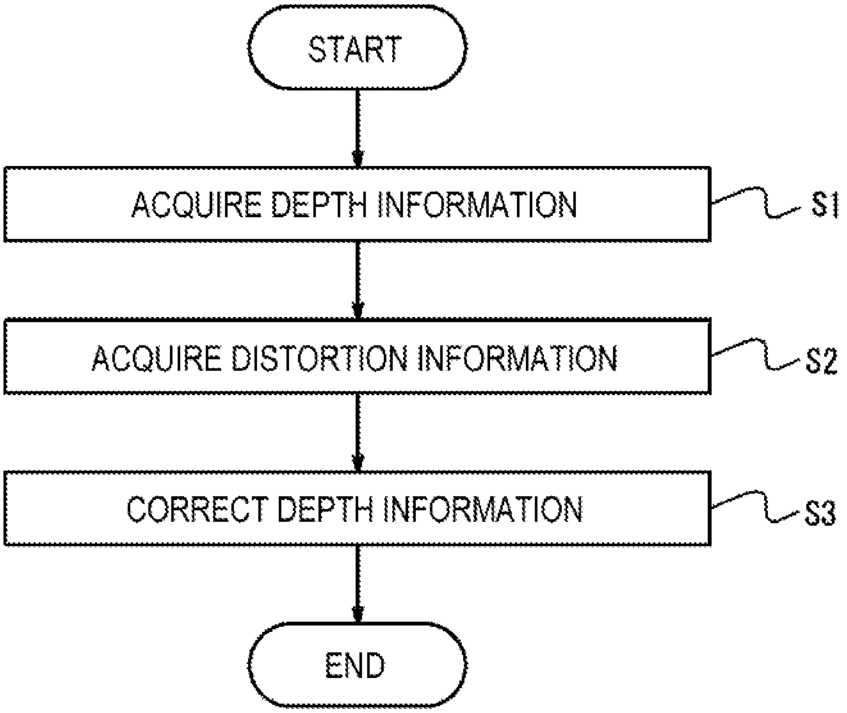
FIG. 8 is a flowchart showing an example of a procedure for an information processing method according to one embodiment.

The control unit 11 of the robot controller 10 may execute an information processing method including the flowchart procedure shown in FIG. 8. The information processing method may be realized as an information processing program to be executed by a processor constituting the control unit 11. The information processing program may be stored on a non-transitory computer-readable medium.

The control unit 11 acquires the depth information from the imaging device 20 (step S1). The control unit 11 acquires the distortion information of the imaging device 20 that generated the depth information (step S2). The control unit 11 corrects the depth information based on the distortion information and generates the corrected depth information (step S3). After executing the procedure of step S3, the control unit 11 terminates the execution of the procedure of the flowchart of FIG. 8. The control unit 11 may control the robot 40 based on the corrected depth information.

The control unit 11 may further acquire color information from the imaging device 20. The control unit 11 may acquire the color information as a photographed image obtained by photographing the work space with the imaging device 20. In other words, the photographed image contains the color information. The control unit 11 may detect the existence position and/or the like of the object 50 and/or the like located in the work space based on the corrected depth information and the color information. As a result, the detection accuracy can be improved compared to the case of detecting the existence position of the object 50 and/or the like based on the depth information. In such a case, for example, the control unit 11 may generate integrated information in which the corrected depth information and the color information are integrated. The correction may be performed based on the corrected depth information as described below.

When controlling the robot 40, the control unit 11 can also transform the work space expressed in the (X, Y, Z) coordinate system into a configuration coordinate system of the robot. The configuration coordinate system of the robot refers, for example, to a coordinate system composed of each parameter that indicates the movement of the robot.

SUMMARY

As described above, the robot controller 10 according to the present embodiment can correct the depth information acquired from the imaging device 20 based on the distortion information of the imaging device 20. If the robot controller 10 acquires a photographed image from the imaging device 20 and corrects the distortion of the photographed image itself, the amount of communication between the robot controller 10 and the imaging device 20 and the calculation load of the robot controller 10 will increase. The robot controller 10 according to the present embodiment can reduce the amount of communication between the robot controller 10 and the imaging device 20 by acquiring, from the imaging device 20, the depth information, which has a smaller data volume than an initial photographed image. By estimating the correction value for depth based on the distortion information, the robot controller 10 can reduce the calculation load compared to performing the correction of the distortion of the photographed image itself and the calculation of the depth based on the corrected photographed image. Thus, the robot controller 10 according to the present embodiment can easily correct the depth information. In addition, only the depth information can be easily corrected without changing the accuracy of the imaging device 20 itself.

By being able to correct the depth information, the robot controller 10 according to the present embodiment can improve the positioning accuracy of the robot 40 with respect to the object 50 located in the work space of the robot 40.

Other Embodiments

Other embodiments are described below.

<Application to Spaces Other than Work Space of Robot 40>

The depth information can be acquired in various spaces, not limited to the work space of the robot 40. The robot control system 1 and the robot controller 10 may be replaced by an information processing system and an information processing device, respectively, which process the depth information in various spaces. The various spaces whose depth information is acquired are also referred to as predetermined spaces.

Examples of the space whose depth information is acquired include a space in which an AGV (Automatic Guided Vehicle) equipped with a 3D stereo camera travels to perform an operation of pressing a door open/close switch. The depth information acquired in such a space is used to improve measurement accuracy of a distance that needs to be traveled from the current position.

Examples of the spaces whose depth information is acquired include a space in which a VR (virtual reality) or a 3D game device equipped with a 3D stereo camera is operated. In such a space, a measurement result of a distance to a controller, a marker or the like held by the player of the VR or 3D game device is acquired as the depth information. The depth information acquired in such a space is used to improve the accuracy of the distance to the controllers, the marker or the like. By improving the accuracy of the distance, the accuracy of aligning the position of a real object (such as a punching ball) in the space where the player is located with the position of the hand of the player in the virtual space is improved.

<Generation of Point Group Data>

The control unit 11 of the robot controller 10 may acquire the depth information acquired from the imaging device 20 in the form of point group data that includes coordinate information of the measurement point in the measurement space. In other words, the depth information may have the form of point group data. In further other words, the point group data may contain the depth information. The point group data is data that represents a point group (also called a measurement point group), which is a set of a plurality of measurement points in the measurement space. It can be said that point group data is data that represents an object in the measurement space with a plurality of points. The point group data also represents the surface shape of an object in the measurement space. The point group data contains coordinate information representing the location of points on the surface of an object in the measurement space. The distance between two measurement points in a point group is, for example, the real distance in the measurement space. Since the depth information has the form of point group data, the data density can be smaller and the data volume can be smaller than the depth information based on the photographed image of the initial data initially acquired by the imaging element 21. As a result, the load of calculation processing when correcting the depth information can be further reduced. The conversion of the depth information from the initial form to the point group data form or the generation of the point group data containing the depth information may be performed by the control unit 22 of the imaging device 20.

When the point group data containing the depth information is generated, the depth information and the color information may be corrected after integrating the color information into the point group data. Even in such a case, since the point group data has a smaller data volume than the initial photographed image, the calculation load can be reduced when correcting the depth information and the like, and the amount of communication between the robot controller 10 and the imaging device 20 can be reduced. In such a case, the integration of the depth information and the color information may be implemented in the control unit 22 of the imaging device 20.

<Correction of Peripheral Illumination of Photographed Image>

In the embodiment described above, the imaging device 20 outputs the depth information of a predetermined space to an information processing device. The imaging device 20 may output an image, such as an RGB (Red, Green, Blue) image or a monochrome image, obtained by photographing the predetermined space as it is, to an information processing device. The information processing device may correct the image obtained by photographing the predetermined space based on the corrected depth information. For example, the information processing device may correct the color information of the image obtained by photographing the predetermined space based on the corrected depth information. The color information refers to, for example, hue, saturation, luminance or lightness.

The information processing device may, for example, correct the brightness or lightness of the image based on the corrected depth information. The information processing device may, for example, correct the peripheral illumination of the image based on the corrected depth information. The peripheral illumination refers to the brightness of the light at the periphery of the lens of the imaging device 20. Since the brightness of the light at the periphery of the lens is reflected in the brightness of the periphery or corners of the photographed image, it can be said that the peripheral illumination refers to the brightness of the periphery or corners in the image, for example. When the imaging device 20 has a lens, the photographed image may be darker at the periphery in the image than at the center in the image due to the difference in light flux density between the center of the lens and the periphery of the lens caused, for example, by lens distortion of the imaging device 20. However, even if the peripheral illumination is small and the periphery or corners in the image are dark, the information processing device can correct the peripheral illumination or color information of the periphery in the image based on the corrected depth information, so that the image data can be free from any problems in robot control.

The information processing device may correct the peripheral illumination or color information of the image based on the magnitude of the correction value for depth corresponding to each pixel of the image. For example, the larger the correction value for depth, the more the peripheral illumination or color information corresponding to that correction value may be corrected.

The information processing device may correct the peripheral illumination or color information of the image. The information processing device may also perform the correction when integrating the depth information with the color information of the RGB image or the like.

The information processing device may also generate corrected depth information obtained by correcting the depth information of the predetermined space based on the distortion information of the imaging device 20, and correct the peripheral illumination or color information of the image based on the generated corrected depth information.

Although the embodiments according to the present disclosure have been described based on the drawings and the examples, it is to be noted that various variations and changes may be made by those who are ordinarily skilled in the art based on the present disclosure. Thus, it is to be noted that such variations and changes are included in the scope of the present disclosure. For example, functions and the like included in each component or the like can be rearranged without logical inconsistency, and a plurality of components or the like can be combined into one or divided.

All the components described in the present disclosure and/or all the disclosed methods or all the processing steps may be combined based on any combination except for the combination where these features are exclusive with each other. Further, each of the features described in the present disclosure may be replaced with an alternative feature for achieving the same purpose, equivalent purpose, or similar purpose, unless explicitly denied. Therefore, each of the disclosed features is merely an example of a comprehensive series of identical or equal features, unless explicitly denied.

The embodiments according to the present disclosure are not limited to any of the specific configurations in the embodiments described above. The embodiments according to the present disclosure can be extended to all the novel features described in the present disclosure or a combination thereof, or to all the novel methods described in the present disclosure, the processing steps, or a combination thereof.

REFERENCE SIGNS

1 robot control system
10 robot controller (11: control unit, 12: storage unit)
20 imaging device (21: imaging element, 21L: left imaging element, 21R: right imaging element, 22: storage unit, 24L: left optical system, 24R: right optical system, 25L, 25R: optical axis, 26L, 26R: optical center, 27L, 27R: incident point)
40 robot (42: arm, 44: hand, 46: mark)
50 object
51L, 51R left photographed image, right photographed image
51P non-distorted image
51Q distorted image
52 measurement point
52L, 52R, 52P, 52Q measurement point image
52V virtual measurement point image

The invention claimed is:

1. An information processing device comprising:

a control unit, the control unit acquiring depth information generated from left and right images, including distortion, capturing a predetermined space and distortion information of an imaging device that captures the predetermined space, the distortion information being information about the distortion included in the left and right images, and correcting the depth information based on the distortion information to generate corrected depth information, wherein the control unit estimates errors, caused by distortion based on the distortion information, in positions of a measurement point in the left and right images including the distortion, and the control unit calculates a correction value for a depth value based on the estimated errors to generate the corrected depth information without correcting the distortion included in the left and right images.

2. The information processing device according to claim 1, wherein the distortion information comprises optical and geometric parameters obtained during manufacturing inspection of the imaging device, the optical and geometric parameters being based on at least one of characteristics of an optical system of the imaging device and errors in the placement of the imaging device.

3. The information processing device according to claim 1, wherein the control unit acquires the distortion information from a storage unit of the imaging device.

4. The information processing device according to claim 1, wherein the control unit acquires, from the imaging device, address information that specifies the location where the distortion information is stored.

5. The information processing device according to claim 1, wherein the control unit acquires an image of the predetermined space from the imaging device and corrects peripheral illumination of the image of the predetermined space based on the corrected depth information.

6. The information processing device according to claim 1, wherein the predetermined space is a work space of a robot, and the control unit controls the robot based on the corrected depth information.

7. An information processing method comprising:

obtaining depth information generated from left and right images, including distortion, capturing a predetermined space and distortion information of an imaging device that captures the predetermined space, the distortion information being information about the distortion included in the left and right images;

estimating errors, caused by distortion based on the distortion information, in positions of a measurement point in the left and right images, including the distortion from the imaging device;

calculating a correction value for a depth value based on the depth value before correction and the estimated errors; and correcting the depth information based on the distortion information to generate corrected depth information without correcting the distortion included in the left and right images.

8. An imaging device comprising:

a first optical system comprising a first lens, the first optical system defining a first optical path through the first lens;

a second optical system comprising a second lens, the second optical system defining a second optical path through the second lens;

a first imaging element positioned along the first optical path, the first imaging element configured to photograph an image of a predetermined space of the first optical path;

a second imaging element positioned along the second optical path, the second imaging element configured to photograph an image of a predetermined space of the second optical path;

a storage unit; and a control unit, wherein the storage unit stores distortion information based on at least one of characteristics of the first optical system and the second optical system and errors in the placement of the first imaging element and the second imaging element, and the control unit is configured to:

generate initial depth information of the first measurement point based on images obtained by photographing a first measurement point in the first predetermined space and the second predetermined space;

estimate errors, caused by distortion based on the distortion information, in position of the first measurement point in the images;

calculate a correction value for a depth value of the initial depth information based on the estimated errors;

generate corrected depth information based on the initial depth information and the correction value without correcting the distortion included in the images; and output the corrected depth information and the distortion information.

9. An information processing system comprising:

an information processing device; and an imaging device, wherein the imaging device includes a first optical system comprising a first lens, the first optical system defining a first optical path through the first lens, a second optical system comprising a second lens, the second optical system defining a second optical path through the second lens, a first imaging element positioned along the first optical path, the first imaging element configured to photograph an image of a predetermined space of the first optical path, a second imaging element positioned along the second optical path, the second imaging element configured to photograph an image of a predetermined space of the second optical path, a storage unit, and a control unit, the storage unit stores as distortion information at least one of characteristics of the first optical system and the second optical system and errors in the placement of the first imaging element and the second imaging element, the control unit is configured to:

generate initial depth information of the first measurement point based on images obtained by photographing a first measurement point in the first predetermined space and the second predetermined space;

estimate errors, caused by distortion based on the distortion information, in position of the first measurement point in the images;

calculate a correction value for a depth value of the initial depth information based on the estimated errors;

generate corrected depth information based on the initial depth information and the correction value without correcting the distortion included in the images; and output the corrected depth information and the distortion information to the information processing device, and the information processing device acquires the corrected depth information from the imaging device.

* * * * *